UNITED STATES PATENT OFFICE.

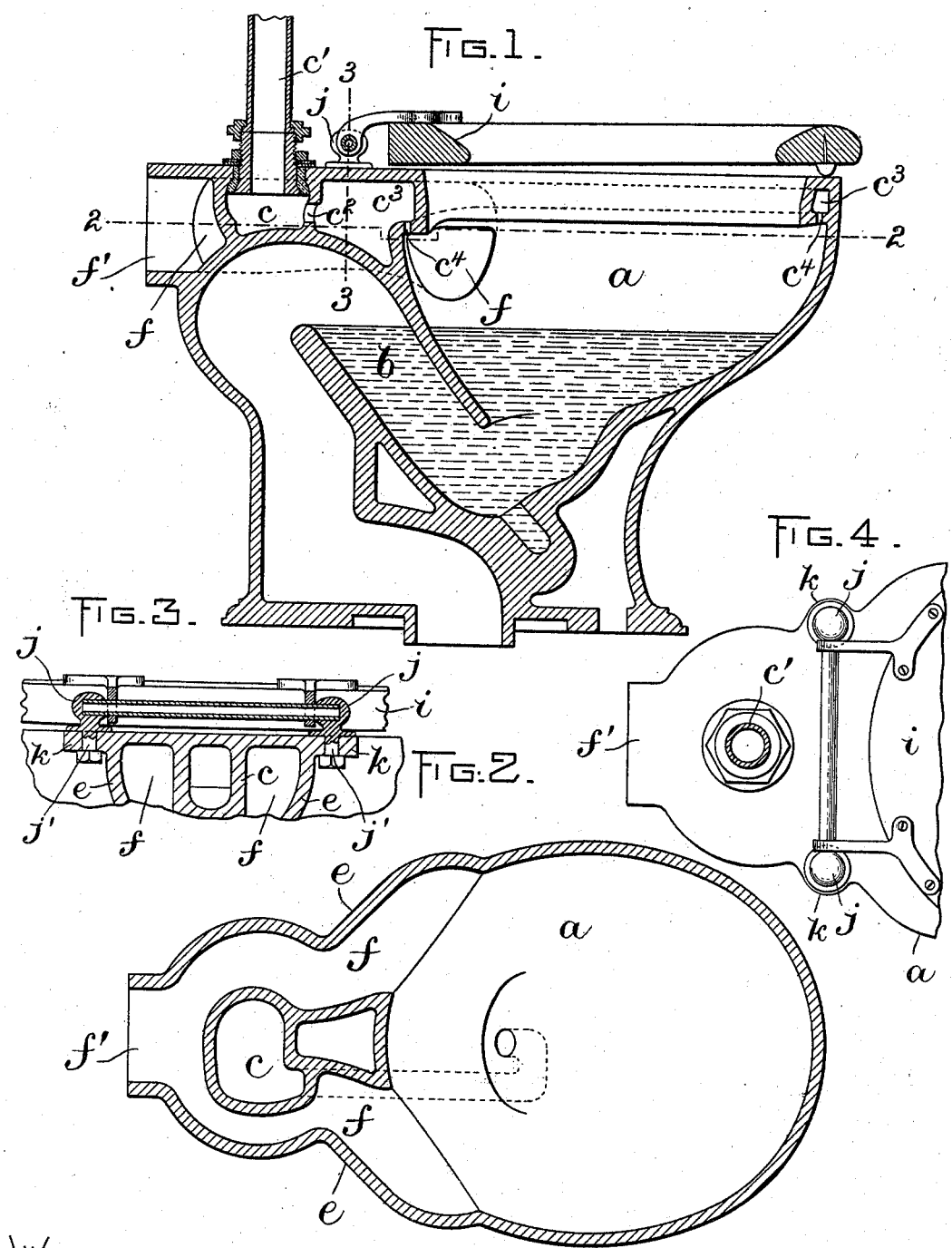

WILLIAM H. LLOYD, OF BOSTON, MASSACHUSETTS, ASSIGNOR TO THE SMITH & ANTHONY COMPANY, OF SAME PLACE.

WATER-CLOSET BOWL.

SPECIFICATION forming part of Letters Patent No. 609,992, dated August 30, 1898.

Application filed October 19, 1895. Serial No. 566,227. (No model.)

*To all whom it may concern:*

Be it known that I, WILLIAM H. LLOYD, of Boston, in the county of Suffolk and State of Massachusetts, have invented certain new and useful Improvements in Water-Closet Bowls, of which the following is a specification.

This invention has for its object to provide certain improvements in siphon-jet water-closet bowls looking to more efficient and thorough ventilation of the same; and it consists in the improvements which I will now proceed to describe and claim.

Of the accompanying drawings, forming a part of this specification, Figure 1 represents a vertical central section of my improved bowl. Fig. 2 represents a section on line 2 2 of Fig. 1. Fig. 3 represents a section on line 3 3 of Fig. 1. Fig. 4 represents a top view of a portion of the bowl.

The same letters of reference indicate the same parts in all the figures.

In the drawings, $a$ represents the hopper or receiver of the bowl of a siphon-jet closet, and $b$ represents the usual leg at the rear of the receiver $a$, said parts being of the usual or any suitable construction.

The structure of the bowl includes a water-receiving casing or chamber $c$, which has an inlet-pipe $c'$ communicating with a water-supply tank and an outlet-port $c^2$ communicating with the channel $c^3$, which extends around the receiving portion of the bowl and supplies the same through a series of outlets $c^4$. I add to the structure above described two outer casings or walls $e\ e$, which are arranged to form, with the walls of the water-receptacle $c$, two relatively large air-passages $f\ f$, which communicate with and extend rearwardly from the rear portion of the receiving portion $a$ of the bowl around the crown of the trap or leg $b$ and unite in a neck $f'$, which projects rearwardly from the bowl and is adapted to be connected with a ventilating pipe or flue.
The chamber or casing $c$ is supported by the crown of the leg, and the ducts $f\ f$, which pass around the said chamber, are likewise supported thereby. The parts are compact and are held against sagging when the structure is in process of construction.

It will be observed that the neck $f'$ has an area in cross-section substantially twice that of each of the air-passages, which are themselves relatively large, so that I provide for the efficient and thorough ventilation of the bowl, whereby the liability of the escape of offensive odors therefrom is effectively prevented. The receiving ends of the air-passages $f\ f$ are made of considerable width, as shown in Fig. 2, so that the space included between their outer walls constitutes substantially the entire width of the bowl. It will be noted that the bottom of each air-passage is upwardly inclined from just above the level of the water and escape through the air-passages, while at the same time the whole body of air can be quickly drawn from the bowl. The addition of the two outer casings or walls $e\ e$ to the structure of the bowl gives said structure such width of its upper portion behind the seat $i$ that it can be utilized to support the fixed members $j$ of the hinges on which the seat swings. In the present case I form outwardly-projecting ears $k\ k$ on the walls or casings $e\ e$, said ears being perforated to receive the bolts or studs $j'$ on the fixed hinge members $j$.

The neck $f'$, projecting rearwardly from the center of the width of the bowl and supported partially by the crown of the cap, is a feature of my invention, since it enables the bowl to be connected with a ventilating-flue by inserting the neck directly in a hole in said flue without the intervention of a metal connecting-pipe, and in this connection it will be seen that the supply-pipe $c'$ communicates with the chamber $c$ from a point above the chamber, whereby there is no danger of water dripping into the ventilating-flue.

Having thus explained the nature of the invention and described a way of constructing and using the same, though without attempting to set forth all of the forms in which it may be made or all of the modes of its use, I declare that what I claim is—

A siphon-jet water-closet, comprising in a single structure a bowl or hopper and a communicating leg or trap, an inlet-chamber $c$ supported upon and having its base formed by the crown of the leg or trap, said chamber having an inlet-aperture, two outer casings or walls forming two ventilating-ducts and extending around the inlet-chamber c, and having large mouths communicating with the bowl, and a neck in the rear of the said chamber into which said ventilating-ducts both lead, said neck being partially formed by the said crown, substantially as described.

In testimony whereof I have signed my name to this specification, in the presence of two subscribing witnesses, this 16th day of October, A. D. 1895.

WM. H. LLOYD.

Witnesses:
C. F. BROWN,
E. BATCHELDER.